United States Patent
Fama et al.

(10) Patent No.: US 7,660,406 B2
(45) Date of Patent: Feb. 9, 2010

(54) SYSTEMS AND METHODS FOR INTEGRATING OUTSOURCERS

(75) Inventors: Jason Fama, Foster City, CA (US); Uri Peleg, Santa Clara, CA (US); Simon Shvarts, Cupertino, CA (US); Mike Bourke, San Francisco, CA (US); James Gordon Nies, Carmel, IN (US); Vinod Prabhu, Fremont, CA (US)

(73) Assignee: Verint Americas Inc., Melville, NY (US)

( * ) Notice: Subject to any disclaimer, the term of this patent is extended or adjusted under 35 U.S.C. 154(b) by 205 days.

(21) Appl. No.: 11/529,842

(22) Filed: Sep. 29, 2006

(65) Prior Publication Data

US 2007/0299680 A1    Dec. 27, 2007

Related U.S. Application Data (60) Provisional application No. 60/816,785, filed on Jun. 27, 2006, provisional application No. 60/817,680, filed on Jun. 30, 2006.

(51) Int. Cl.
*H04M 3/523*    (2006.01)
*H04Q 3/64*    (2006.01)

(52) U.S. Cl. .............................. 379/265.05; 379/265.12; 379/266.04; 705/8

(58) Field of Classification Search ...................... 705/8, 705/9
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,111,391 A | 5/1992 | Fields et al. | |
| 5,117,225 A | 5/1992 | Wang | |
| 5,164,983 A * | 11/1992 | Brown et al. | ........... 379/265.03 |
| 5,210,789 A | 5/1993 | Jeffus et al. | |
| 5,239,460 A | 8/1993 | LaRoche | |

(Continued)

FOREIGN PATENT DOCUMENTS

| | | |
|---|---|---|
| EP | 0453128 A2 | 10/1991 |
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |
| WO | 2006/058004 A1 | 6/2006 |

OTHER PUBLICATIONS

"Customer Spotlight: Navistar International," Web pae, unverified print date of Apr. 1, 2002.

(Continued)

*Primary Examiner*—Harry S Hong (57) ABSTRACT

Systems and methods for integrating outsourcers are provided. In this regard, a representative method includes: receiving information corresponding to resources of a first contact center; and correlating the information with other information in order to improve integration of resources of the first contact center with resources of one or more other contact centers.

20 Claims, 7 Drawing Sheets

U.S. PATENT DOCUMENTS

| | | |
|---|---|---|
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,115,693 A * | 9/2000 | McDonough et al. ......... 705/10 |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIllwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIllwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIllwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 | 11/2005 | Leamon |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |

| | | |
|---|---|---|
| 2003/0154240 A1 | 8/2003 | Nygren et al. |
| 2004/0062380 A1 | 4/2004 | Delaney |
| 2004/0100507 A1 | 5/2004 | Hayner et al. |
| 2004/0165717 A1 | 8/2004 | McIlwaine et al. |
| 2004/0267591 A1 | 12/2004 | Hedlund et al. |
| 2005/0135607 A1 | 6/2005 | Lee et al. |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study The Business Challenge," Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,*" *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10$^{th}$ Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You on (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico, *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

EchoStar, *MediaX Mix Interactive Multimedia With Interactive Television*, PRNews Wire, Jan. 11, 1999.

Furger. The Internet Meets the Couch Potato, PCWorld, Oct. 1996.

*Hong Kong Comes First with Interactive TV*, Sci-Tech, Dec. 4, 1997.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, 093/28/96.

Kenny. *TV Meets Internet*, PC World Online, Mar. 28, 1996.

Linderholm. *Avatar Debuts Home Theater PC*, PC World Online, Dec. 1, 1999.

Rohde. *Gates Touts Interactive TV*, InfoWorld, Oct. 14, 1999.

Ross. *Broadcasters Use TV Signals to Send Data*, PC World Oct. 1996.

Stewart. *Interactive Television at Home: Television Meets the Internet*, Aug. 1998.

Wilson. *U.S. West Revisits Interactive TV*, Interactive Week, Nov. 28, 1999.

* cited by examiner

```
GENERATE SCHEDULES FOR AGENTS OF REMOTE CONTACT   410
                      CENTER

EXPORT INFORMATION RELATING TO SCHEDULES    412
```

FIG. 4

```
<EmployeeList>
    <OrganizationName>PSI-03</OrganizationName>
    <Employee>
        <FirstName>Dong</FirstName>
        <LastName>Ngo</LastName>
        <MiddleInitial></MiddleInitial>
        <AdditionalInfo>
            <EmployeeSchedule>
                <ShiftAssignment>
                    <Event/>
                    <ShiftActivity>
                        <Event>
                            <Activity>Meeting</Activity>
                            <Start>2005-10-03 10:00:00</Start>
                            <End>2005-10-03 10:15:00</End>
                        <Event>
                    </ShiftActivity>
                </ShiftAssignment>
            </EmployeeScedule>

<SkillAssignment>
                <Skill>Phone</Skill>
                <Reserve>false</Reserve>
            </SkillAssignment>

<SkillAssignment>
                <Skill>Email</Skill>
                <Reserve>true</Reserve>
            </SkillAssignment>

</AdditionalInfo>
    </Employee>
</EmployeeList>
```

SYSTEMS AND METHODS FOR INTEGRATING OUTSOURCERS

CROSS REFERENCE TO RELATED APPLICATIONS

This application is a utility application that claims the benefit of and priority to U.S. provisional applications having Ser. Nos. 60/816,785 and 60/817,680, which were filed on Jun. 27, 2006 and Jun. 30, 2006, respectively, and which are incorporated by reference herein.

TECHNICAL FIELD

The present invention is generally related to integration of outsourced contact center resources.

DESCRIPTION OF THE RELATED ART

Resource allocation and planning, including the generation of schedules for employees, is a complex problem for enterprises. Telephone call center resource allocation and scheduling is an example of a problem with a large number of variables. Variables include contact volume at a particular time of day, available staff, skills of various staff members, call type (e.g., new order call and customer service call), and number of call queues, where a call queue may be assigned a particular call type. A basic goal of call center scheduling is to minimize the cost of agents available to answer calls while maximizing service.

Traditionally, call center scheduling is performed by forecasting incoming contact volumes and estimating average talk times for each time period based on past history and other measures. These values are then correlated to produce a schedule. However, due to the number of variables that may affect the suitability of a schedule, many schedules need to be evaluated.

Recently, call centers have evolved into "contact centers" in which the agent's contact with the customer can be through many contact media. For example, a multi-contact center may handle telephone, email, web callback, web chat, fax, and voice over internet protocol. Therefore, in addition to variation in the types of calls (e.g., service call, order call), modern contact centers have the complication of variation in contact media. The variation in contact media adds complexity to the agent scheduling process. Additional complexity results when multiple geographically distributed contact center sites are involved.

SUMMARY

Systems and methods for integrating outsourcers are provided. In this regard, a representative method includes: receiving information corresponding to resources of a first contact center; and correlating the information with other information in order to improve integration of resources of the first contact center with resources of one or more other contact centers.

Another embodiment of such a method comprises: receiving information corresponding to resources of a first contact center that shares contacts with a second contact center, the information being configured as an XML file; importing the information into a database, the database being accessible to a workforce manager application associated with the second contact center that is operative to retrieve information stored in the database; correlating the resources contained in the XML file with resources that are to be used at the second contact center; and allocating resources of the second contact center using the information from the database, wherein the allocating is based, at least in part, on a correlation between the resources of the first contact center and the second contact center.

An exemplary embodiment of a system for integrating outsourcers comprises an integration system operative to receive information corresponding to resources of a first contact center, the integration system being further operative to correlate the received information with other information in order to improve integration of resources of the first contact center with resources of one or more other contact centers.

Other systems, methods, features and/or advantages of the present invention will be or become apparent to one with skill in the art upon examination of the following drawings and detailed description. It is intended that all such additional systems, methods, features and/or advantages be included within this description and protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Systems and methods for integrating outsourcers are provided. In this regard, current workforce optimization (WFO) solutions can potentially provide planning, forecasting, scheduling, and tracking and performance analysis services for customers who have full control over contact center work load as well as resources (e.g., agents) available to handle this work load. The typical implementation of such a solution is a centralized system with a single database deployed on premises. However, this approach is changing due to outsourcing.

For contact centers that share contacts across their own sites and outsourced sites through percent allocation or virtual routing, outsourcing of contact center activities (e.g., scheduling of agents and agent handling of contacts) tends to distribute control from a single ("local") contact center to multiple other ("remote") contact centers. As control over these activities is divested from the local contact center, the ability of the local contact center to plan efficient agent staffing and scheduling can be degraded.

Currently, in order to compensate for lack of information and control involving work resources available at remote contact centers, a customer may attempt to model the resources available at the remote sites within the customer's system. However, such a customer typically does not have full information about the resources available (e.g., skills of the agents at the remote sites) or schedules, thereby reducing the accuracy of planning.

In order to alleviate these difficulties, at least some embodiments of the systems for integrating outsourcers involve the use of a distributed set of servers. That is, instead of operating only a centralized database and application server at the local site, in some embodiments, at least one server is deployed at each of the remote ("outsourcer") sites, in addition to a server being deployed at the local site. The servers are used to implement workforce manager applications that are used to generate agent schedules for staffing the respective contact centers. Additionally, the servers located at the remote sites are used to export information relating to their scheduled agents, with the information being imported by the server of the local site. The local server then uses the information for facilitating efficient planning for use of the local contact center resources and/or tracking performance of the remote contact center resources.

Figure 1:
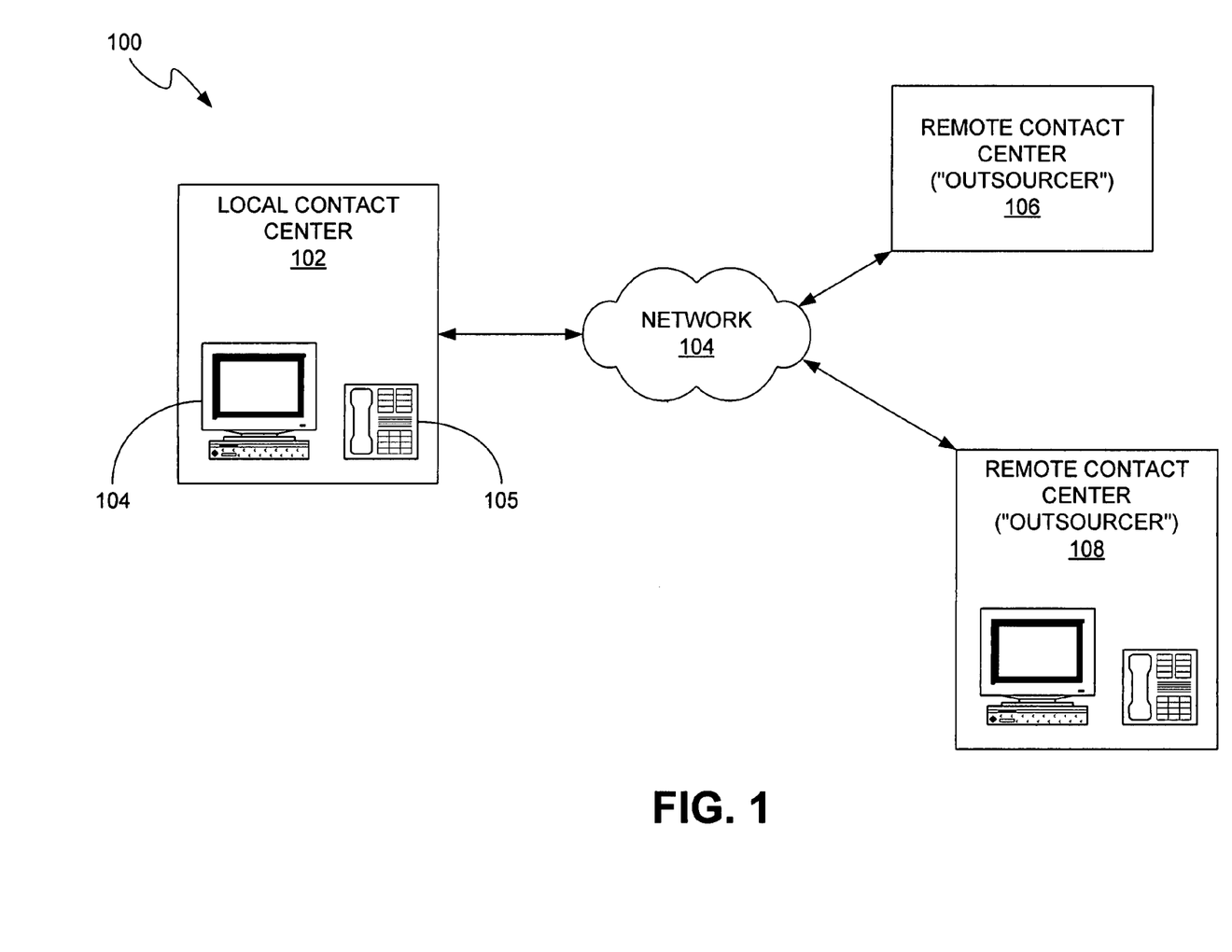
FIG. 1 is a schematic diagram illustrating an exemplary embodiment of a system for integrating outsourcers.

Referring to the drawings, FIG. 1 is a schematic diagram illustrating an exemplary embodiment of a system for integrating outsourcers. In this regard, system 100 incorporates a local contact center 102. The local contact center has access to various resources including a staff of agents that is used to interact with customers who communicate with the local contact center. It should be noted that interactions between an agent and a customer can be facilitated through the use of various media. By way of example, interactions can take place via telephone (such as via telephone 104), voice over Internet Protocol (VoIP), email (such as via workstation 105) and chat, for example, with such communication taking place via network 104.

System 100 also includes remote contact centers ("outsourcers") 106 and 108, each of which can be geographically distributed with respect to local contact center 102. Each of these contact centers is able to communicate information to the local contact center and/or receive information from the local contact center via the network. In particular, communication of information between the remote contact centers and the local contact center can enable various forms of integration, e.g., scheduling and tracking, of resources. By way of example, such communication can enable the local contact center to effectively utilize its staff of agents as will be described in detail below. It should be noted that although two remote contact centers are depicted in FIG. 1, various other numbers of such contact centers can be provided in other embodiments.

Figure 2:
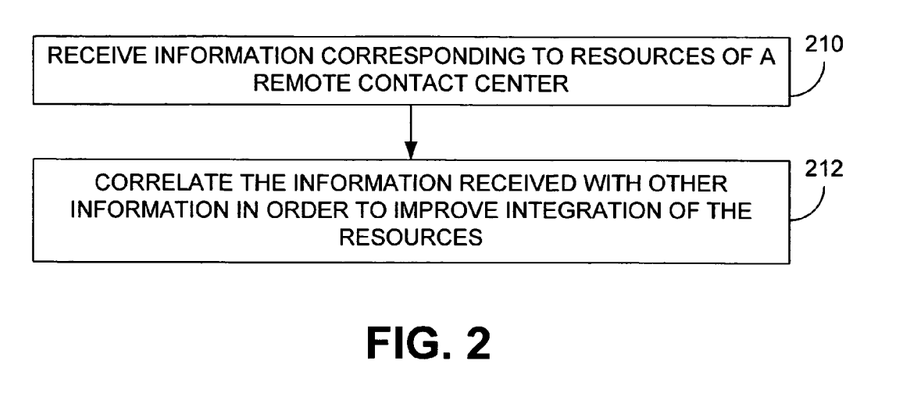
FIG. 2 is a flowchart illustrating functionality (or method steps) that can be performed by an embodiment of a system for integrating outsourcers.

FIG. 2 is a flowchart illustrating functionality (or method steps) that can be performed by an embodiment of a system for integrating outsourcers, such as the embodiment depicted in FIG. 1. In this regard, the functionality may be construed as beginning at block 210, in which information corresponding to a remote contact center is received. In some embodiments, this information can include skills of agents and schedules for those agents.

In block 212, the information received from the remote contact center is correlated with other information in order to improve integration of resources of the remote contact center, such as with resources of one or more other contact centers. By way of example, correlating information from multiple contact centers enables schedules of the resources of the multiple contact centers to be integrated so that efficient staffing can be achieved. In some embodiments, such integration can additionally or alternatively include the allocation of contacts among contact centers, and the tracking of staffing and/or service levels provided by outsourcers. Clearly, various other integrations are possible in which information associated with one or more contact centers is correlated with information associated with one or more other contact centers.

As mentioned before, information from a contact center can be exported to another system for analysis. Due to potential variations in the type and/or format of the information being exported, such information may need to be filtered, e.g., mapped to corresponding data fields of the importing system, in order to ensure that the exported information can be used by the importing system.

In those embodiments in which the exporting system is compatible (e.g., identical) with the importing system, correlation of information between the systems can be performed automatically. In other embodiments, such correlation may be performed manually or in a semi-automated manner, as will be described in greater detail later.

Figure 3:
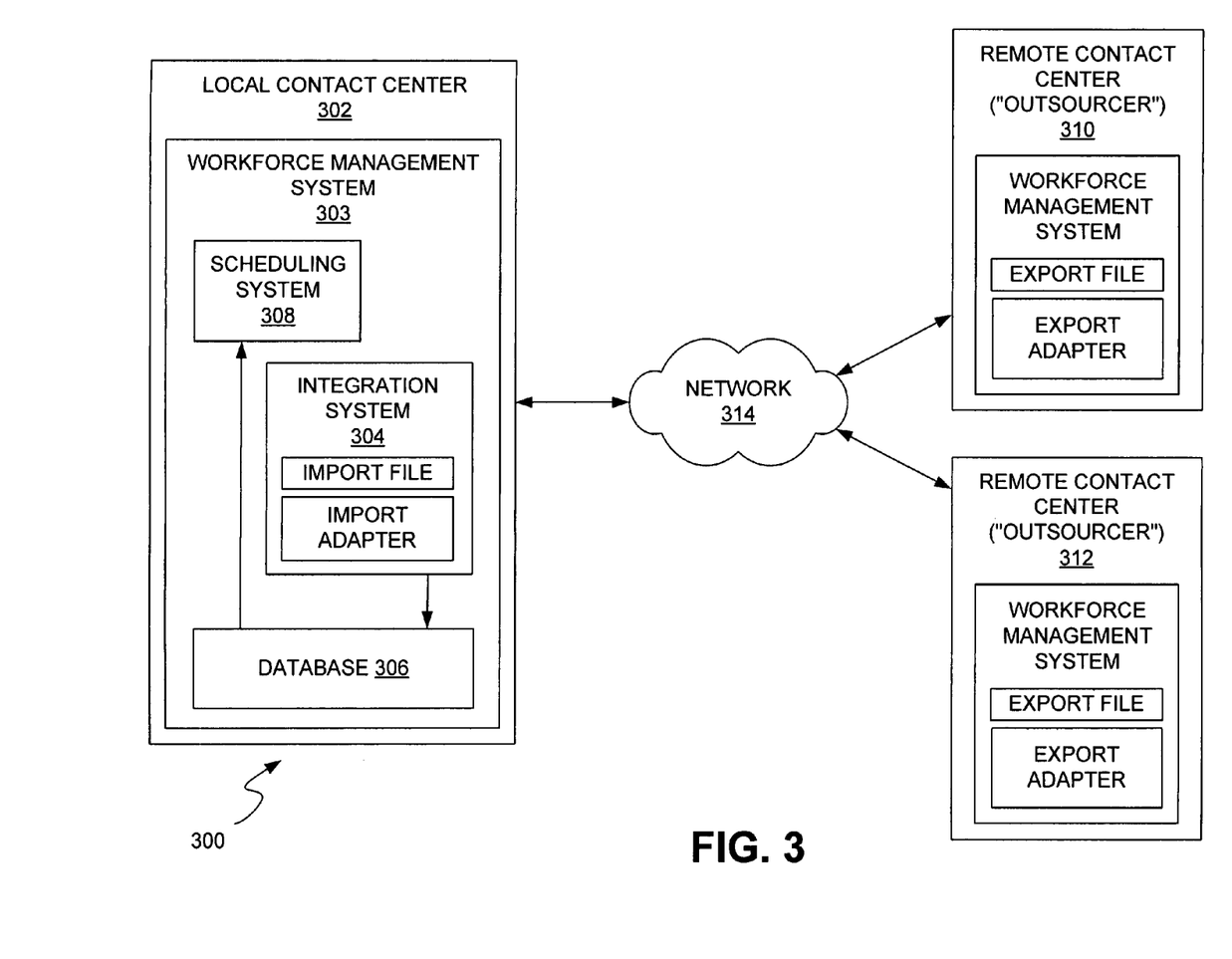
FIG. 3 is a schematic diagram illustrating another exemplary embodiment of a system for integrating outsourcers.

FIG. 3 is a schematic diagram illustrating another exemplary embodiment of a system for integrating outsourcers. In particular, system 300 incorporates a local contact center 302. The local contact center has access to various resources including a staff of agents that is used to interact with customers who communicate with the local contact center. Local contact center 302 includes a workforce management system 303 that includes an integration system 304, a database 306 and a scheduling system 308. Notably, the workforce management system can be implemented by one or more applications running on one or more servers, for example.

System 300 also includes remote contact centers 310 and 312, each of which typically is geographically distributed with respect to local contact center 302. Each of the remote contact centers is able to communicate information to the local contact center and/or receive information from the local contact center via network 314. Notably, each of the remote contact centers has access to various resources including a staff of agents that is used to interact with customers. In some embodiments, contacts are distributed among the local and remote contact centers via percent allocation or virtual routing, for example.

Notably, each of the remote contact centers and the local contact center typically is responsible for staffing and scheduling of its respective staff of agents. In this regard, each of the remote contact centers typically schedules its staff based on general contact-handling requirements that are communicated to the remote contact center through an outsourcing agreement with the local contact center in the form of forecasted requirements. In contrast, the local contact center uses more specific information obtained from the remote contact centers in order to facilitate staffing and scheduling of its agents as will be described in greater detail below.

In operation, workforce management system 303 is able to communicate forecasted requirements, such as agent requirements, workload to be handled and specific schedules to be staffed, to one or more of the remote contact centers. It should be noted that, in some embodiments, the remote contact centers need not be provided with forecasted requirements. Regardless, the remote contact centers generate work schedules for their agents, such as by using other potentially disparate workforce management systems (e.g., remote contact center 310 uses workforce management system 316). Once generated, information related to the generated schedules is communicated to the local contact center via the network, such as by each of the remote contact centers exporting a file containing the information. By way of example, in the embodiment of FIG. 3, remote contact center 310 communicates export file 320 to the integration system 304 of local contact center 302.

Figure 4:
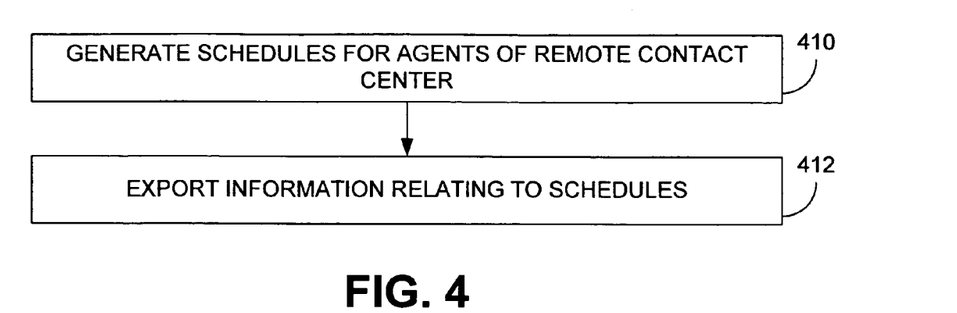
FIG. 4 is a flowchart illustrating functionality (or method steps) that can be performed by an embodiment of a remote contact center.

In this regard, FIG. 4 is a flowchart illustrating functionality (or method steps) that can be performed by an embodiment of a remote contact center. As shown in FIG. 4, the functionality may be construed as beginning at block 410, in which schedules for agents of the remote contact center are generated. In block 412, information related to the schedules is exported.

In some embodiments, a schedule export adapter of a workforce management system of the remote contact center is used to prepare and export information related to the schedules. In particular, the information can include one or more of the following: a list of agents, skills of the agents, and generated work schedules for the agents. The information then can be communicated, such as in a selected file format, to the local contact center via the network.

In some embodiments, a schedule export adapter includes the following configuration items: location of export file (e.g., an edit box can specify the location of the export file); an agent filter (e.g., a drop down menu item that contains a list) used to determine which agent schedules are to be exported; and a timer setting (e.g., a box used to specify how often a file should be exported (for example, every 30 minutes).

Once configured, the schedule export adapter can place a file containing the agents, skills and schedules in the specified location. Notably, the schedules contain the activities that each agent is scheduled to perform.

It should be noted that various file types and arrangements of data can be used to provide the information to the local contact center. In this regard, FIG. 5 is a diagram illustrating an embodiment of a file, in this case an XML file, that can be exported by a workforce management system of a remote contact center and which includes such information.

Figure 5:
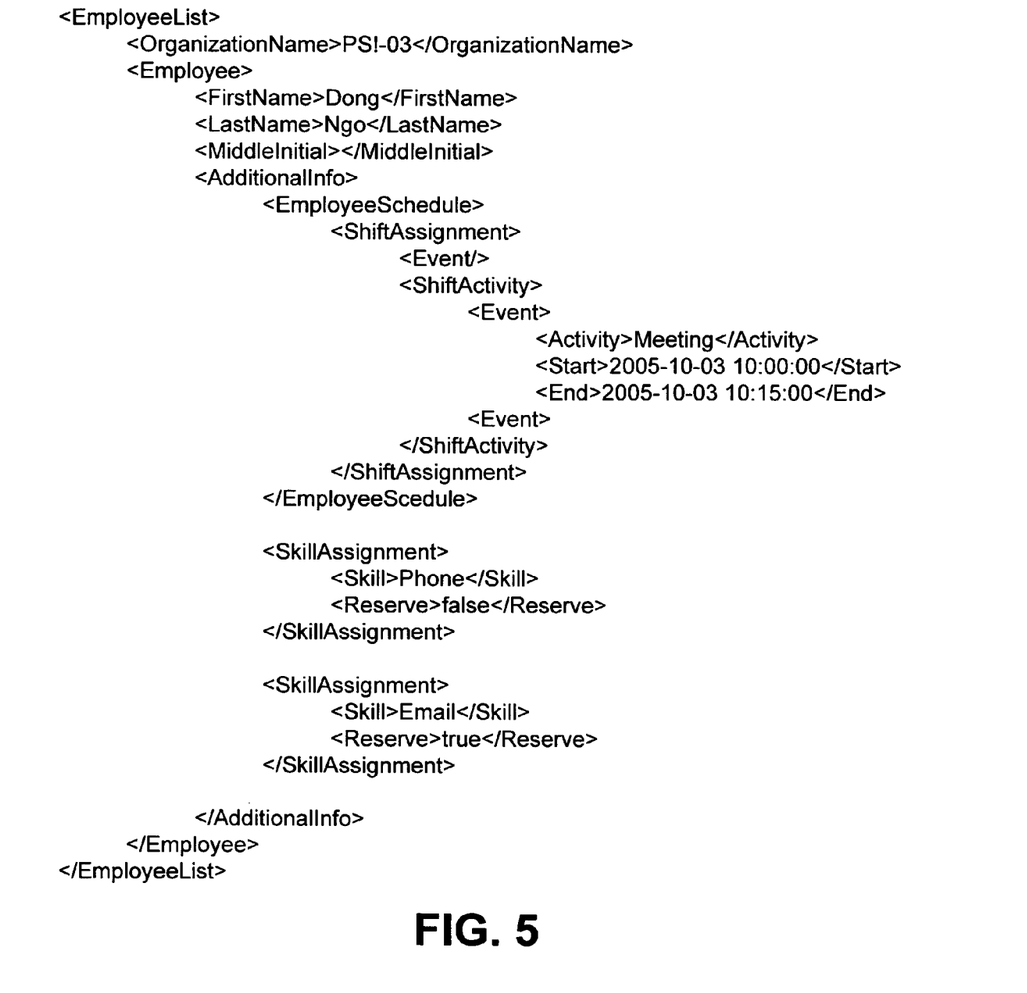
FIG. 5 is a diagram illustrating an embodiment of a file that can be exported by a remote contact center.

As shown in FIG. 5, the file includes an employee list (<EmployeeList>) that is delineated by organization (<OrganizationName>). Within each organization is a list of agents. Included with each agent (<Employee>) is information corresponding to the agent's name (<FirstName>, <LastName>, and <MiddleInitial>), as well as additional information. This additional information (<AdditionalInfo>) includes a work schedule (<EmployeeSchedule>) and skills of the agent (<SkillAssignment>).

An integration system of the local contact center includes a schedule import adapter that is used to extract information from the files exported from the remote contact centers. An embodiment of such an adapter can include: the location of the import file (e.g., an edit box to specify the location of a file that was exported); activity and skill maps; and the name of the organization in which schedules associated with the export file should be placed on the local system.

Figure 6:
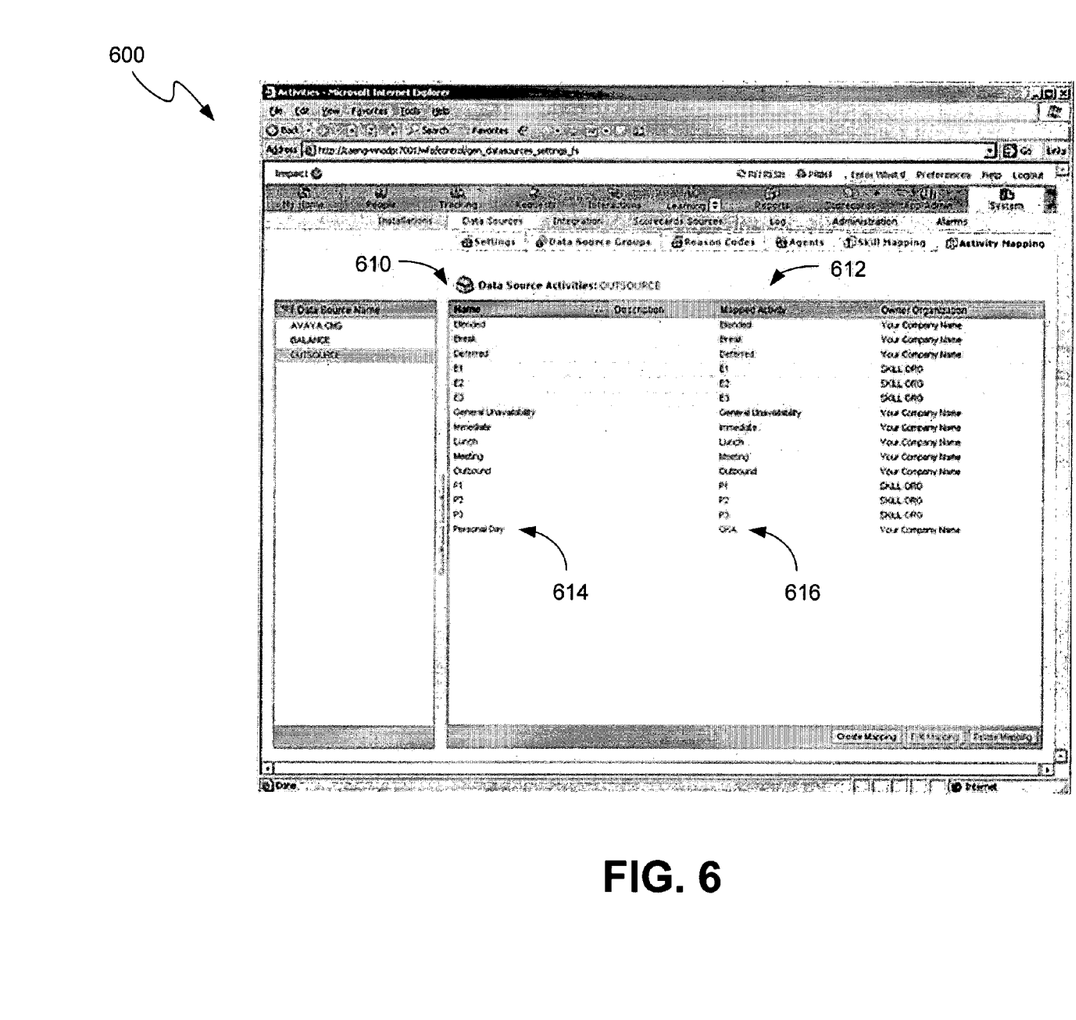
FIG. 6 is a diagram illustrating a representative screen that can be used to perform activity mapping.

In this regard, FIG. 6 is a diagram illustrating a representative screen that can be used to perform activity mapping. Specifically, such a screen can be used to specify the name of an activity on the workforce management system of the local contact center that corresponds to an activity listed in the exported file. This may be necessary as the remote contact center may use different names for their activities than those used by the local contact center. By way of example, screen 600 incorporates a Name field 610 that lists names of activities from the exported file. A Mapped Activity field 612 is used to designate correspondence between activities from the exported file and activity names used by the local contact center. By way of example, field 610 includes an activity 614 entitled "Personal Day" that is mapped to a corresponding mapped activity 616 entitled "CKA." Thus, each instance of a Personal Day activity discovered in the exported file will be recognized as a CKA activity by the local contact center for scheduling purposes.

In order to use the file exported by a remote contact center, some embodiments incorporate the use of a dialog box associated with the workforce management system. In this regard, FIG. 7 is a diagram illustrating a representative dialog box 700 that can be used in importing of such information.

Figures 7, 8:
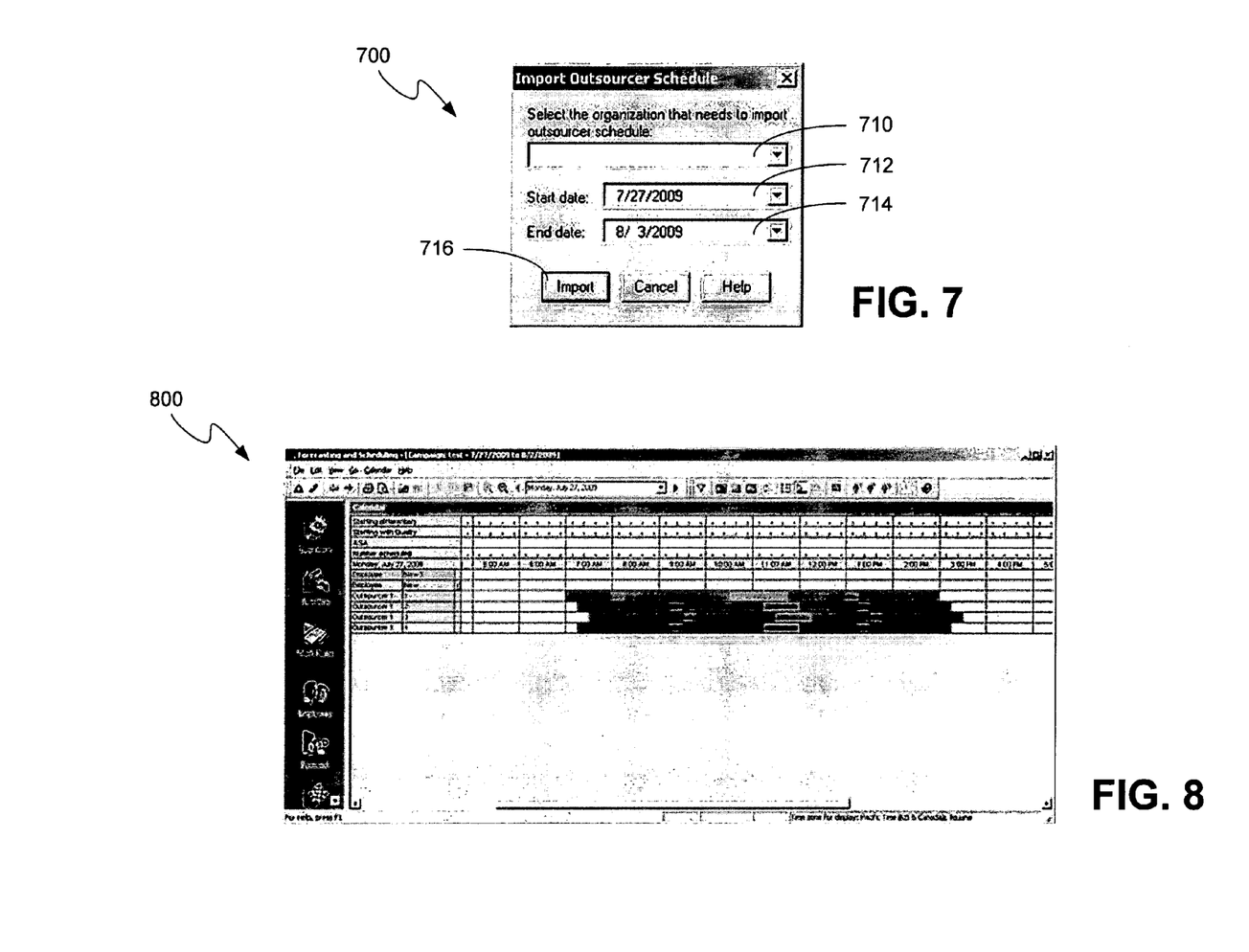
FIG. 7 is a diagram illustrating a representative dialog box that can be used in importing of outsourcer schedules.
FIG. 8 is a diagram illustrating a representative screen associated with a staffing profile.

As shown in FIG. 7, a user designates an organization from which information is to be imported. This is accomplished by entering an organization name in field 710. A date range also is entered in the fields 712 and 714, with the range designating a scheduling period of interest.

Responsive to actuating the import actuator 716, the schedule import adapter parses the imported file and creates staffing profiles. These staffing profiles include agent skills and schedules. FIG. 8 is a diagram illustrating a representative screen 800 associated with a staffing profile. As shown in FIG. 8, schedules of four agents of a remote contact center (Outsourcers 1-4) are shown.

Generally, this screen displays all schedules of agents and staffing profiles in a Gantt style chart. Different colors represent different activities that an agent or staffing profile should perform. Additionally, statistics such as service level or staffing are displayed at the top of the screen.

Since each of the agents of the remote contact center has an established schedule and corresponding skills, scheduling of agents of the local contact center can be generated using this knowledge. That is, the staffing profiles are considered as counting towards service levels when scheduling or simulating by the local contact center. Thus, more effective scheduling of the local contact center agents can be accomplished.

It should be noted that, in this embodiment, the schedules for the agents of the remote contact centers are locked. That is, regardless of the schedules determined for the agents of the local contact center, the schedules of the agents of the remote contact center are not altered. However, in some embodiments, the schedules of the agents of the remote contact centers can be unlocked, thus allowing scheduling determinations from the local contact center to influence the schedules of the remote contact center agents.

More information on various aspects of multi-site contact centers can be found, for example, in U.S. patent application Ser. No. 11/385,499, filed on Mar. 21, 2006, which is incorporated herein by reference.

Figure 9:
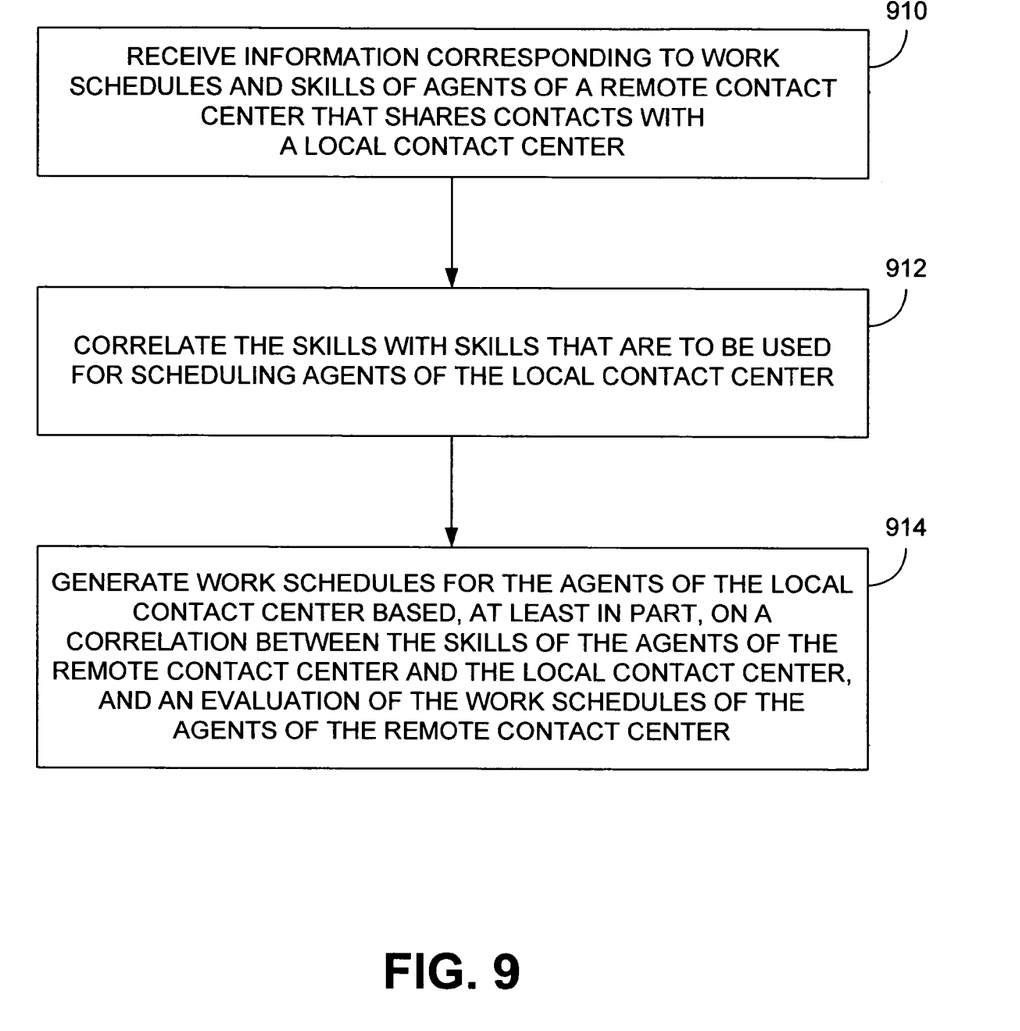
FIG. 9 is a flowchart illustrating functionality (or method steps) that can be performed by an embodiment of a system for integrating outsourcers.

FIG. 9 is a flowchart illustrating functionality (or method steps) that can be performed by an embodiment of a system for integrating outsourcers, such as the embodiment depicted in FIG. 1. In this regard, the functionality may be construed as beginning at block 910, in which information is received. Specifically, the information corresponds to work schedules and skills of agents of a remote contact center. In some embodiments, contacts that are to be serviced by the remote contact center agents can be allocated among additional contact centers such as among other remote contact centers and/ or a local contact center. In this regard, "contacts" denote the communications involved in facilitating interactions between agents and customers. Notably, information corresponding to various skills of the contact center agents, such as information corresponding to skills possessed, skill priority and skill proficiency, can be provided.

In block 912, the skills communicated by the information are correlated with skills that are to be used for scheduling agents of at least one other contact center, e.g., another remote contact center and/or a local contact center. In some embodiments, such as when the scheduling system used to provide the skills information is compatible (e.g., identical) with the scheduling system being used to perform the correlating, correlation of information can be performed automatically. In other embodiments, such correlation may be performed manually or in a semi-automated manner.

In block, 914, work schedules for the agents of the at least one other contact center are generated. Specifically, the work schedules are based, at least in part, on a correlation between the skills of the agents of the remote contact center and of the at least one other contact center, and an evaluation of the work schedules of the agents of the remote contact center.

Figure 10:
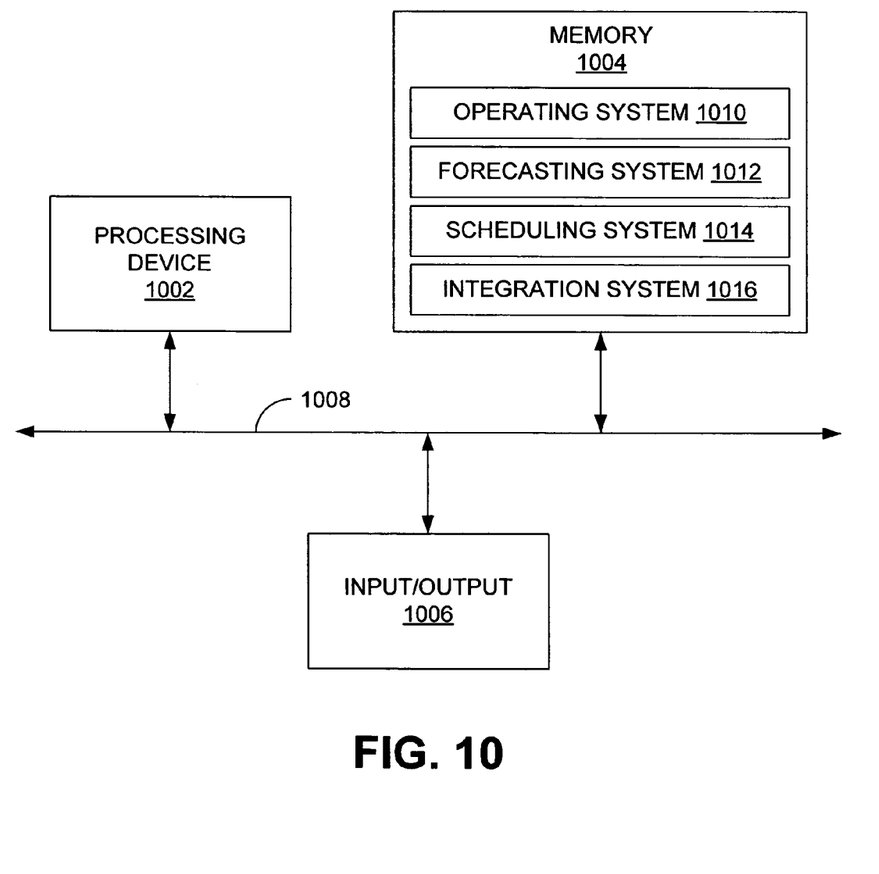
FIG. 10 is a schematic diagram of a computer that can be used to implement an embodiment of a system for integrating outsourcers.

FIG. 10 is a schematic diagram of a computer 1000 that can be used to implement an embodiment of a system for scheduling contact center agents. It should be noted that the computer 1000 could be located in a local contact center or at a location connected to the local contact center via a communication network. Generally, the computer includes a processing device 1002, memory 1004, and input/output device 1006 that intercommunicate via local interface 1008. The local interface can include, for example, but is not limited to one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processing device can be a hardware device for executing software, particularly software stored in memory. The processing device can be a custom made or commercially available processor, a central processing unit (CPU) or an auxiliary processor among several processors, a semiconductor-based microprocessor (in the form of a microchip or chip set), a macroprocessor, or generally any device for executing software instructions.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory (as well as various other components) can have a distributed architecture, where various components are situated remote from one another, but can be accessed by the processing device. Additionally, the memory can include an operating system 1010, as well as instructions associated with various subsystems, such as a forecasting system 1012, which can be used to provide forecasted requirements, a scheduling system 1014, which can be used to generate agent schedules, and an integration system 1016, which can be used to receive information regarding agents of a remote contact center.

It should be noted that a system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the computer is in operation, the processing device is configured to execute software stored within the memory, to communicate data to and from the memory, and to generally control operations of the system pursuant to the software. Software in memory, in whole or in part, is read by the processing device, perhaps buffered, and then executed.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function (s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured media.

It should be emphasized that the above-described embodiments are merely possible examples of implementations. Many variations and modifications may be made to the above-described embodiments. By way of example, although several embodiments are described herein that involve the use of systems performing correlation of information at least some of which is associated with agents that are considered local to that system. However, such correlation can be provided even if such local agents are not involved. That is, in some embodiments, systems can correlate information associated with agents of remote contact centers only. All such modifications and variations are intended to be included herein within the scope of this disclosure.

Therefore, having thus described the invention, at least the following is claimed:

1. A method for integrating outsourcers comprising:
generating a forecast requirement related to a volume of contacts to be handled by a first contact center;
transferring the forecast requirement from a second contact center to the first contact center, wherein the first contact center generates work schedules for resources of the first contact center based on the forecast requirement and skills of the resources of the first contact center;
receiving information corresponding to the resources of the first contact center that shares contacts with the second contact center, wherein the information comprises the work schedules and the skills of the resources of the first contact center, and wherein the work schedules comprise activities;

importing the information into a database, the database being accessible to a workforce manager application associated with the second contact center that is operative to retrieve information stored in the database;

correlating the skills contained in the information with skills that are to be used for scheduling resources of the second contact center;

correlating the activities contained in the information with activities that are to be used for scheduling the resources of the second contact center; and allocating the resources of the second contact center using the information from the database, wherein the allocating is based, at least in part, on a correlation between the skills of the resources of the first contact center and the second contact center, a correlation between the activities of the resources of the first contact center and the second contact center, and an evaluation of the work schedules of the resources of the first contact center.

2. The method of claim 1, further comprising allocating contacts between the first contact center and the second contact center, wherein at least some of the contacts are communicated via Internet protocol (IP) packets.

3. The method of claim 1, wherein:
the resources include agents; and
allocating comprises determining work schedules of the agents of the second contact center.

4. The method of claim 3, wherein determining the work schedules of the agents of the second contact center comprises evaluating potential schedules for the agents of the second contact center based on service level goals computed using contributions of the agents of the first contact center.

5. The method of claim 1, wherein, in receiving information, the information is received from a workforce manager application, associated with the first contact center, of a disparate type with respect to the workforce manager application associated with the second contact center.

6. The method of claim 1, wherein the first contact center is a remote contact center and the second contact center is a local contact center.

7. The method of claim 1, wherein the information received is configured as an XML file.

8. The method of claim 1, wherein the correlating steps are performed in order to improve integration of the resources of the first contact center with the resources of the second contact center.

9. The method of claim 1, wherein the work schedules of the resources of the first contact center are locked such that the work schedules of the resources of the first contact center are not changed responsive to allocating the resources of the second contact center.

10. The method of claim 1, wherein the skills contained in the information comprise a skill priority and a skill proficiency for each skill of each resource of the first contact center.

11. A system for integrating outsourcers comprising:
a processing device configured to execute a forecasting system operative to generate a forecast requirement related to a volume of contacts to be handled by a first contact center and transfer the forecast requirement from a second contact center to the first contact center, wherein the first contact center generates work schedules for resources of the first contact center based on the forecast requirement and skills of the resources of the first contact center;

the processing device configured to execute an integration system operative to receive information corresponding to the resources of the first contact center that shares contacts with the second contact center, wherein the information comprises the work schedules and the skills of the resources of the first contact center, and wherein the work schedules comprise activities;

a database operative to store the information, the database being accessible to a workforce manager application associated with the second contact center that is operative to retrieve information stored in the database;

the processing device configured to execute the integration system operative to correlate the skills contained in the information with skills that are to be used for scheduling resources of the second contact center, and correlate the activities contained in the information with activities that are to be used for scheduling the resources of the second contact center; and the processing device configured to execute a scheduling system operative to communicate with the integration system and to allocate the resources of the second contact center using the information from the database, wherein the allocation is based, at least in part, on a correlation between the skills of the resources of the first contact center and the second contact center, a correlation between the activities of the resources of the first contact center and the second contact center, and an evaluation of the work schedules of the resources of the first contact center.

12. The system of claim 11, further comprising the scheduling system operative to allocate contacts between the first contact center and the second contact center, wherein at least some of the contacts are communicated via Internet protocol (IP) packets.

13. The system of claim 11, wherein:
the resources include agents; and
the scheduling system, to allocate the resources of the second contact center, determines work schedules of the agents of the second contact center.

14. The system of claim 13, wherein the scheduling system determines the work schedules of the agents of the second contact center by evaluating potential schedules for the agents of the second contact center based on service level goals computed using contributions of the agents of the first contact center.

15. The system of claim 11, wherein the integration system receives the information from a workforce manager application associated with the first contact center, of a disparate type with respect to the workforce manager application associated with the second contact center.

16. The system of claim 11, wherein the first contact center is a remote contact center and the second contact center is a local contact center.

17. The system of claim 11, wherein the integration system receives the information configured as an XML file.

18. The system of claim 11, wherein the integration system correlates the skills and the activities contained in the information with the skills and the activities that are to be used for scheduling the resources of the second contact center in order to improve integration of the resources of the first contact center with the resources of the second contact center.

19. The system of claim 11, wherein the work schedules of the resources of the first contact center are locked such that the work schedules of the resources of the first contact center are not changed responsive to the allocation of the resources of the second contact center by the scheduling system.

20. The system of claim 11, wherein the skills contained in the information comprise a skill priority and a skill proficiency for each skill of each resource of the first contact center.

* * * * *

UNITED STATES PATENT AND TRADEMARK OFFICE
CERTIFICATE OF CORRECTION

PATENT NO.       : 7,660,406 B2                                    Page 1 of 1
APPLICATION NO.  : 11/529842
DATED            : February 9, 2010
INVENTOR(S)      : Fama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Thirtieth Day of November, 2010

David J. Kappos
*Director of the United States Patent and Trademark Office*